Sept. 17, 1940.   J. C. HOSTETTER   2,215,041
HEATING AND RESHAPING GLASS ARTICLES
Filed Dec. 7, 1938
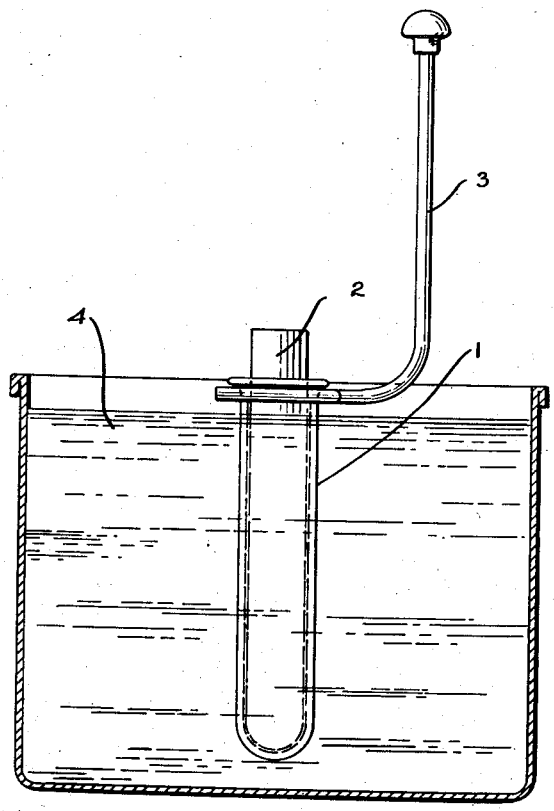
INVENTOR.
JOHN C. HOSTETTER
BY Dorsey Cole & Garner
ATTORNEYS.

Patented Sept. 17, 1940

2,215,041

UNITED STATES PATENT OFFICE 2,215,041

HEATING AND RESHAPING GLASS ARTICLES

John C. Hostetter, West Hartford, Conn., assignor to Corning Glass Works, Corning, N. Y., a corporation of New York Application December 7, 1938, Serial No. 244,461

3 Claims. (Cl. 49—84)

The present invention relates to the reheating and reshaping of glass articles, and particularly to reheating and reshaping hollow glass articles such, for example, as measuring vessels or tubes, to give them exact predetermined inner shape and capacity characteristics.

The prime object of the invention is a simple process of imparting exact predetermined size and shape characteristics to hollow glassware.

In order to assist in a clear understanding of the invention reference is made to the accompanying drawing illustrating a simple manner of practicing the invention.

Referring to the drawing, 1 designates a glass test tube to be given an internal shape conforming to that of the external shape of a mandrel 2 introduced into the tube. The tube, suspended from a suitable support 3, is slowly lowered into a bath 4 of hot molten salt which softens the glass. As the glass becomes soft the pressure exerted thereon by the buoyant effect of the bath brings the glass into intimate contact with the mandrel, after which the assembly is withdrawn from the bath and allowed to cool. The mandrel is then readily withdrawn from the tube which will have an internal configuration exactly conforming to that of the exterior surface of the mandrel.

If desired, the same result can be obtained by immersing the tube and mandrel into a cold bath of molten salt and raising the temperature thereof and that of the mandrel and tube together as required to bring about softening and pressing of the tube into intimate contact with the mandrel.

The heating bath is above specified as a molten salt, but it will be understood that molten metals may be employed if desired. Either molten tin or lead would be suitable, although tin would be preferred.

Although applicant has herein described his method as applied to the reshaping of a simple tube structure, it should be understood that his method is not limited to such structures, but may be employed to impart desired predetermined irregular internal shapes to hollow glass structures of varying external shape.

What is claimed is:

1. The method of reshaping a hollow glass article closed at one end, which includes introducing into such article a rigid member of a size and shape corresponding to the size and shape to be imparted to the article, and heating the walls of the article by advancing it closed end foremost into a liquid bath until a major portion of the article is immersed therein, said liquid bath being heated to a temperature sufficient to soften the glass and allow the hydrostatic pressure of the liquid to force the glass into intimate contact with the member.

2. The method of reshaping a hollow glass article closed at one end, which includes introducing into such article a rigid member of a size and shape corresponding to the size and shape to be imparted to the article, heating the walls of the article by advancing it closed end foremost into a liquid bath until a major portion of the article is immersed therein, said liquid bath being heated to a temperature sufficiently high to soften the glass and allow the hydrostatic pressure of the liquid to force the glass into intimate contact with the member, removing the article from the bath, allowing the article and member to cool and then removing the member from the article.

3. The method of reshaping a hollow glass article closed at one end, which includes introducing into such article a rigid member of a size and shape corresponding to the size and shape to be imparted to the article, heating the walls of the article by advancing it closed end foremost into a liquid bath of greater specific gravity than the glass until a major portion of the article is immersed therein, said liquid bath being heated to a temperature sufficient to soften the glass and allow the hydrostatic pressure of the liquid to force the glass into intimate contact with the member.

JOHN C. HOSTETTER.